_United States Patent_ [19]

Wynosky

[11] 4,240,519
[45] Dec. 23, 1980

[54] ACOUSTICAL TURBINE ENGINE TAIL PIPE PLUG

[75] Inventor: Thomas A. Wynosky, Madison, Conn.

[73] Assignee: United Technologies Corporation, Hartford, Conn.

[21] Appl. No.: 54,099

[22] Filed: Jul. 2, 1979

[51] Int. Cl.³ .......................... F01N 1/02; F02K 1/04
[52] U.S. Cl. .................................... 181/213; 60/271
[58] Field of Search ............. 181/213, 215, 219, 224, 181/264, 272, 281, 276; 60/271, 725

[56] References Cited
U.S. PATENT DOCUMENTS

| | | | |
|---|---|---|---|
| 938,101 | 10/1909 | Winters | 181/264 |
| 1,597,397 | 8/1926 | Wilkinson | 181/264 |
| 2,934,891 | 5/1960 | Brown | 60/725 |
| 4,064,961 | 12/1977 | Tseo | 181/213 |
| 4,137,992 | 2/1979 | Herman | 181/213 |

_Primary Examiner_—L. T. Hix
_Assistant Examiner_—Benjamin R. Fuller
_Attorney, Agent, or Firm_—Norman Friedland

[57] ABSTRACT

A compartmentized muffler plug for the tail pipe of a jet engine is disclosed where the compartments are formed by conically shaped axially disposed partitions whose base bears against the wall of the plug and is in compression to accommodate radial growth and the sound suppression openings to the grazing flow are disposed to face the slanted walls of the partition to enhance sound suppression.

3 Claims, 1 Drawing Figure

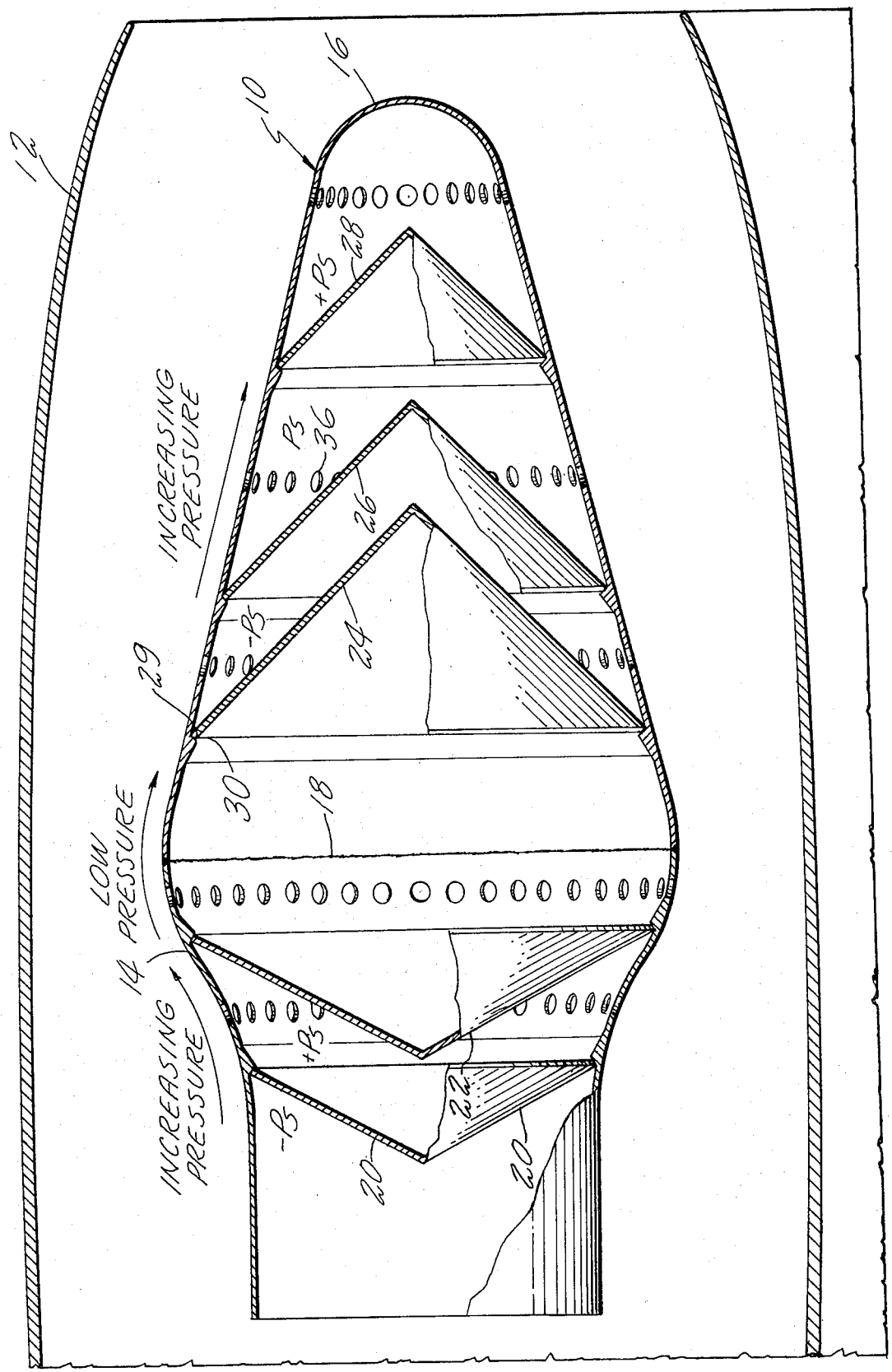

ACOUSTICAL TURBINE ENGINE TAIL PIPE PLUG

BACKGROUND OF THE INVENTION

This invention relates to muffler plugs for a gas turbine engine and particularly to means for compartmentizing the plug for sound absorption effectiveness while having good structural integrity notwithstanding the hostile environment.

A problem that existed heretofore is that the adversity accompanying the thermal growth because of the hostile environment made compartmenting difficult, if not impossible, compartmenting has advantages for sound suppression effectiveness but because of the stress problems encountered the development of this acoustic technique has been curtailed.

I have found that I can obviate the above referenced stress problems by forming the walls of the compartments with axially facing spaced cones that are interference fitted so that the cone base bears against the inner diameter of the plug wall. Pressurization of the compartments forces the cones into their seats and enhances the radial readjustment during thermal growth. Additionally, the plug tubes admitting grazing flow and pressure waves into the compartments are oriented to face the slanted wall of the cones to further enhance sound absorption.

SUMMARY OF THE INVENTION

A feature of this invention is to compartmentize the exhaust muffler plug mounted in the tail pipe of a jet engine with axially facing spaced cones whose base bears against the inner diameter of the plug wall. The slanted wall of the cone is in compression and the compartments are pressurized for accommodating thermal growth occasioned by the surrounding hostile environment. A further feature is the orientation of the acoustic tubes or openings to face the slanted walls of the cones to enhance sound absorption.

Other features and advantages will be apparent from the specification and claims and from the accompanying drawings which illustrate an embodiment of the invention.

BRIEF DESCRIPTION OF THE DRAWINGS

The sole FIGURE is a view in section showing the plug with the conically shaped walls defining compartments therein.

DESCRIPTION OF THE PREFERRED EMBODIMENT

As shown in the sole FIGURE, the plug generally illustrated by reference numeral 10 is disposed in tail pipe 12 of a jet engine (not shown). The plug is formed in two pieces, the fore portion 14 and aft portion 16 and is split at the maximum diameter and butt welded along seam 18. Before being joined, the conical partitions 20, 22, 24, 26 and 28 are interference fitted internally of the plug and each base 29 (one being described for simplicity sake) thereof seats against step 30 formed on the inner diameter of the plug. The material of the cone is selected to withstand the hostile environment and has a degree of flexibility and resiliency so that the base is squeezed radially inwardly upon installation so that the walls of the cone are in compression. This affords good structural integrity notwithstanding the high stress encountered due to thermal growth. This aspect is further enhanced because of the pressurization of the individual compartments which force the walls of the cone radially outward.

As noted from the sole FIGURE, the holes 36 which are designed to suppress noise admits the grazing flow into these compartments and are oriented, where possible, to face the slanted wall of the cone, this further enhances sound absorption.

It should be understood that the invention is not limited to the particular embodiments shown and described herein, but that various changes and modifications may be made without departing from the spirit and scope of this novel concept as defined by the following claims.

I claim:

1. A muffler plug mounted in the tail pipe of a turbine power plant including a curved hollow body generated about an axis of revolution having a generally symmetrical configuration along an axial centerline, said body being spaced from the wall of the tailpipe to define therewith an annular passage for flowing the power plant's working medium, a plurality of concially shaped spaced members each having its apex located coincidental with said axial centerline and defining therewith a plurality of axially spaced subchambers, openings in said body for leading grazing flow into said subchambers from said annular passage, the base of each of said conically shpaed member bearing against said body for structurally supporting said body and said members being in compression so as to compensate for radial growth from the heat transfer from the heat from the working medium.

2. A muffler plug as in claim 1 wherein the inner diameter includes step-like annular portions for accommodating the base of each of said concially shaped spaced member.

3. A muffler plug as in claim 2 wherein said hollow body includes a fore portion and aft portion joined along a plane intermediate the ends of the hollow body at its largest diameter, the apexes of said conical members in the fore portion points in an upstream direction relative to the grazing flow and the apexes of said conical members in the aft portion point in a downstream direction relative the said grazing flow.

* * * * *